US006967928B1

(12) United States Patent
Kikuta (10) Patent No.: US 6,967,928 B1
(45) Date of Patent: Nov. 22, 2005

(54) INTERNET TELEPHONY SYSTEM

(75) Inventor: Rumiko Kikuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,822

(22) Filed: Mar. 20, 2000

(30) Foreign Application Priority Data

Jun. 29, 1999 (JP) ............................... 11-183402

(51) Int. Cl.$^7$ ............................................. H04J 1/16
(52) U.S. Cl. ...................... 370/252; 370/400; 370/474
(58) Field of Search ............................... 370/352–356, 370/389, 392, 401, 230, 230.1, 229, 252, 370/468, 386, 474, 400, 428, 443, 465; 379/88.17

(56) References Cited

U.S. PATENT DOCUMENTS

| | | | | |
|---|---|---|---|---|
| 5,027,351 | A * | 6/1991 | De Prycker et al. | 370/229 |
| 6,021,440 | A * | 2/2000 | Post et al. | 709/231 |
| 6,023,456 | A * | 2/2000 | Chapman et al. | 370/252 |
| 6,157,635 | A * | 12/2000 | Wang et al. | 370/352 |
| 6,289,389 | B1 * | 9/2001 | Kikinis | 709/239 |
| 6,292,495 | B1 * | 9/2001 | Von Hammerstein et al. | 370/465 |
| 6,519,636 | B2 * | 2/2003 | Engel et al. | 709/223 |
| 6,542,504 | B1 * | 4/2003 | Mahler et al. | 370/392 |
| 6,707,799 | B1 * | 3/2004 | Chui | 370/282 |

FOREIGN PATENT DOCUMENTS

JP         10-173696        6/1998
JP         10-271162        10/1998

* cited by examiner

Primary Examiner—John Pezzlo (74) Attorney, Agent, or Firm—Katten Muchin Rosenman LLP (57) ABSTRACT

An Internet telephony system is capable of not only restraining a delay of transfer of a voice packet but also transferring a data packet at a high efficiency by fragmenting the data packet and thus routing the data packet only when the voice packet flows. The Internet telephone system has an Internet network for transferring voice information as the voice packet which is transmitted from a voice communications terminal incorporating a voice communications function, and transferring data as the data packet which are transmitted from a data communications terminal incorporating a data communications function. This system includes a first detecting unit for detecting a transition of a call-out state of the voice communications terminal, a packet assembling unit for assembling, when the first detecting unit detects the transition of the call-out state of the voice communications terminal, a control packet containing indication information for changing, to a predetermined limit value, a maximum length of each of the data packets transferred via the Internet network, and a first routing unit for routing, when receiving the control packet containing the indication information, each of the data packets and the voice packet to the Internet network while restricting the maximum length of the data packet to the predetermined limit value.

13 Claims, 8 Drawing Sheets

CONTINUED FROM FIG. 5

RECEIVING CIRCUIT 75, WHEN CONTENT OF IDENTIFIER ID IS[01] AND CONTENT OF FRAGMENTATION INFORMATION DV IS[00] AND SHOWS DATA PACKET FRAGMENTATION START INDICATION, STORES DATA PACKET FRAGMENTATION START INDICATION INFORMATION BY SETTING DATA PACKET FRAGMENTATION START BIT IN BUILT-IN MEMORY TO[1], AND NOTIFIES DATA PACKET FRAGMENTATION CIRCUIT 72 OF BEING IN DATA PACKET FRAGMENTATION START INDICATION RECEIVING STATUS — S56

DATA PACKET FRAGMENTATION CIRCUIT 72, THERE BEING NECESSITY FOR TRANSFERRING (PRIORITY TRNASFER) VOICE PACKET AUP, SETS MAXIMUM PACKET LENGTH TO PREDETERMINED SMALL VALUE — S57

DATA PACKET FRAGMENTATION CIRCUIT 72 THEREAFTER ROUTES DATA PACKET DTP AND VOICE PAKCET AUP WITH VALUE UNDER THIS SET VALUE — S58

QUEUE CONTROL CIRCUIT 73 IDENTIFIES THAT THE PACKET IS VOICE PACKET AUP BASED ON FACT THAT FORWARDING IP ADDRESS IN IP HEADER IPH INDICATES IP ADDRESS CORRESPONDING TO GATEWAY IT-GW1, ACCUMMULATES VOICE PCAKET AUP IN QUEUE BUFFER MEMORY EXHIBITING TOP OR HIGH PRIORITY, AND FORWARD WITH HIGHER PRIORITY THAN DATA PACKET DTP TO INTERNET NETWORK 9 VIA NETWORK INTERFACE CIRCUIT 74 — S59

END

FIG.8

CONTINUED FROM FIG. 7

RECEIVING CIRCUIT 75, WHEN CONTENT OF IDENTIFIER ID IS[01] AND CONTENT OF FRAGMENTATION INFORMATION DV IS[01] AND SHOWS DATA PACKET FRAGMENTATION END INDICATION, STORES DATA PACKET FRAGMENTATION END INDICATION INFORMATION BY SETTING DATA PACKET FRAGMENTATION END BIT IN BUILT-IN MEMORY TO[0], AND NOTIFIES DATA PACKET FRAGMENTATION CIRCUIT 72 OF BEING IN DATA PACKET FRAGMENTATION END INDICATION RECEIVING STATUS — S66

DATA PACKET FRAGMENTATION CIRCUIT 72, THERE BEING NO NECESSITY FOR TRANSFERRING VOICE PACKET AUP, SETS MAXIMUM PACKET LENGTH TO PREDETERMINED LARGE VALUE — S67

DATA PACKET FRAGMENTATION CIRCUIT 72 THEREAFTER ROUTES DATA PACKET DTP WITH VALUE UNDER THIS SET VALUE — S68

QUEUE CONTROL CIRCUIT 73 TEMPORARILY STROES QUEUE BUFFER MEMORY WITH DATA PCAKET DTP INPUTTED FROM DATA PACKET FRAGMENTATION CIRCUIT 72, AND FORWARDS PACKET DTP TO INTERNET NETWORK 9 VIA NETWORK INTERFACE CIRCUIT 74 — S69

END

INTERNET TELEPHONY SYSTEM

BACKGROUND OF THE INVENTION

The present invention relates generally to a composite switched network system capable of reducing costs for equipment and operations by integrating a circuit switched network such as a telephone network with a connectionless packet switched network such as an Internet network or an Intranet network, and more particularly to an Internet telephone system capable of communications of voice information in the form of packets via the Internet network or the Intranet network.

With a progress of networking technology such as acquiring a much broader band of Local Area Network (LAN) and a progress of PC technology such as attaining multi-functions of a personal computer (PC) and a speed-up of a CPU applied to the PC over the recent years, it is feasible in terms of utilization to perform communications of voice information at a high speed between the PCs on a plurality of LANs. With those technological progresses, application software executed between the PCs on the Internet network (which includes the Intranet network if not particularly specified in this Specification), constructed of private lines for voice communications on conventional telephones, the LAN and Wide Area Network (WAN) and a hardware system incorporating this software, have been rapidly put into markets. This system is called [Internet telephony].

In this Internet telephony system, a VoIP (Voice over Internet Protocol) technology is used for integrating the voice communications with data communications. The VoIP technology is that the voice is converted into a frame at an interval of a short time (on the order of 20 ms) according to a network layer protocol used in the Internet, i.e., on the network having the IP (IP network), and a packet assembled by adding an IP header to the frame is transmitted and received. Note that the communications of the voice information in a computer network have a long history in which the first packet switching was experimented in 1974 in ARPANET (Advanced Research Projects Agency Network) as the predecessor to the Internet (refer to "RFC741: Specifications for the Network Voice Protocol (NVP)", IETF, Danny Cohen, 1976).

Further, there has been developed an Internet telephony gateway which incorporates a gateway functions for making a communications protocol conversion between the telephone network and the Internet network and actualizes the communications between the telephone network and the Internet network. There was proposed and has already been utilized a system (Internet-telephony-based cored system) in which the information is relayed via the Internet network between respective switches in the conventional telephone network by use of the Internet telephony gateways.

Generally, an operation for a telephone talk in the cored system of the Internet telephony has a lower cost than a telephone talk (voice communication) through the conventional telephone network, and therefore this cored system and services are now in the process of a rapidly spread. The transmission (transfer) standard in the cored system using the Internet telephony gateways is not, however, established, and what exists at the present is only ITU-T Recommendation H.450.2 (H.323) which defines the services within the Internet network, and the services in the conventional telephone network. Namely, there is no transmission standard on which to communicate the information to between the Internet telephony gateway having a function of converting the voice information given from the telephone network into a packet on the basis of the Internet Protocol (IP) and a router incorporating a function of routing the IP packet.

In the Internet telephony system, it is indispensable for routing the voice packet based on the Internet Protocol while restraining a delay to fragment short each of data packets (such as file-transfer packets) flowing simultaneously in the Internet network and thus transfer those packets. To describe it in depth, when starting the forwarding of the data packet as in the file transfer even if the voice packet is controlled with a high priority, the voice packet exhibiting a higher urgency which has arrived at afterward can not be forwarded if not waiting till a transmission of the data packet now undergoing the processing is finished. In a low-speed link, this waiting time is long, and a voice quality declines due to a transfer delay of the voice packet. In the case of transferring, for example, a 1500-byte packet onto a private line having a transmission speed on the order of 64 Kbps, a time of 180 ms is needed. A time for which the voice delay is allowable in the telephone talk is, generally speaking, 200 ms between the terminals (End-to-End), and the waiting time of 180 ms described above is extremely long.

A scheme for obviating this problem is to reduce a packet processing time by fragmenting the data packet having a packet length into pieces of small fragments and transfer the packet in such a manner that the voice packet is inserted into a gap between the fragmented data packets, thereby restraining the transfer delay. A prior art for thus fragmenting the data packet may involve multilink PPP (Point-to-Point Protocol) interleaving (IETF (Internet Engineering Task Force) draft: MCML) and setting an MTU length. According to this prior art, however, the data packet is always fragmented even when the voice packet does not flow, and hence a decrease in efficiency is inevitable in terms of transferring the data packet. That is, in the case of the data packet having a short packet length, the router as a relay device in the network has a high load. As a result, for instance, a file transfer is finished sooner by forwarding the data packet on a 1500-byte basis than forwarding the data packet with a fragmentation by every 300 bytes.

SUMMARY OF THE INVENTION

Accordingly, it is a primary object of the present invention to provide an Internet telephony system capable of not only restraining a transfer delay of a voice packet but also transferring a data packet at a high efficiency by routing fragmented data packets.

According to one aspect of the present invention, to accomplish the above object, an Internet telephone system has an Internet network for transferring voice information in the form of a voice packet which is transmitted from a voice communications terminal incorporating a voice communications function, and transferring data in the form of a data packet which are transmitted from a data communications terminal incorporating a data communications function. The Internet telephony system comprises a first detecting unit for detecting a transition of a call-out state of the voice communications terminal, a packet assembling unit for assembling, when the first detecting unit detects the transition of the call-out state of the voice communications terminal, a control packet containing indication information for changing, to a predetermined limit value, a maximum length of each of the data packets transferred via the Internet network, and a first routing unit for routing, when receiving the control packet containing the indication information, each of the data packets and the voice packet to the Internet network while restricting the maximum length of the data packet to the predetermined limit value.

In this architecture, the Internet telephony system may further comprise a second routing unit for preferentially routing the voice packet to the Internet network under the condition that the first routing unit routes the data packet in accordance with the predetermined limit value. The first routing unit, when receiving the control packet, may fragment the data packet having a length exceeding the predetermined limit value in order to route each of the data packets to the Internet network in accordance with the predetermined limit value.

The Internet telephony system may further comprise a second detecting unit for detecting an end-of-communications state of the voice communications terminal. When the second detecting unit detects the end-of-communications state of the voice communications terminal, the packet assembling unit may assemble a control packet containing indication information in order for the first routing unit to make each of the data packets transferable to the Internet network up to the maximum length. Each of the voice packet, the data packet and the control packet may take the form of an Internet Protocol packet. In the Internet telephony system, the first and second detecting unit and the packet assembling unit may be provided in a gateway for converting the voice information transmitted from the voice communications terminal into a packet in accordance with the Internet Protocol, and the first and second routing unit may be provided in a router for routing the IP packet to the Internet network.

According another aspect of the present invention, there is provided a method of controlling a packet transfer in an Internet telephone system having an Internet network for transferring voice information in the form of a voice packet which is transmitted from a voice communications terminal incorporating a voice communications function, and transferring data in the form of a data packet which are transmitted from a data communications terminal incorporating a data communications function. The packet transfer control method comprises a first step of detecting a transition of a call-out state of the voice communications terminal, a second step of assembling, when detecting the transition of the call-out state of the voice communications terminal, a control packet containing indication information for changing, to a predetermined limit value, a maximum length of each of the data packets transferred via the Internet network, and a third step of routing, when receiving the control packet containing the indication information, each of the data packets and the voice packet to the Internet network while restricting the maximum length of the data packet to the predetermined limit value.

In this architecture, the packet transfer control method may further comprise a fourth step of preferentially routing the voice packet to the Internet network under the condition that the data packet is routed in accordance with the predetermined limit value in the third step.

This method may further comprise a fifth step of detecting an end-of-communications state of the voice communications terminal. The packet transfer control method may further comprise a sixth step of assembling, when the end-of-communications state of the voice communications terminal is detected in the fifth step, a control packet containing indication information for making each of the data packets transferable to the Internet network up to the maximum length.

According to the present invention, even when the voice packet is transferred via the Internet network, it is possible to properly dynamically set a maximum packet length exerting a large influence upon a communications performance in the network.

As a result, if constructing an environment for transferring the voice packets in the Internet telephony system, the routing of the data packets has hitherto been adjusted for routing the voice packets, resulting in a decline of efficiency. This drawback can be, however, obviated by the present invention. It is because the data packets can be optimally routed when the voice packets are not transferred.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Next, embodiments of the present invention will hereinafter be described with reference to the accompanying drawings.

[Structure of Internet Telephony System]

Figure 1:
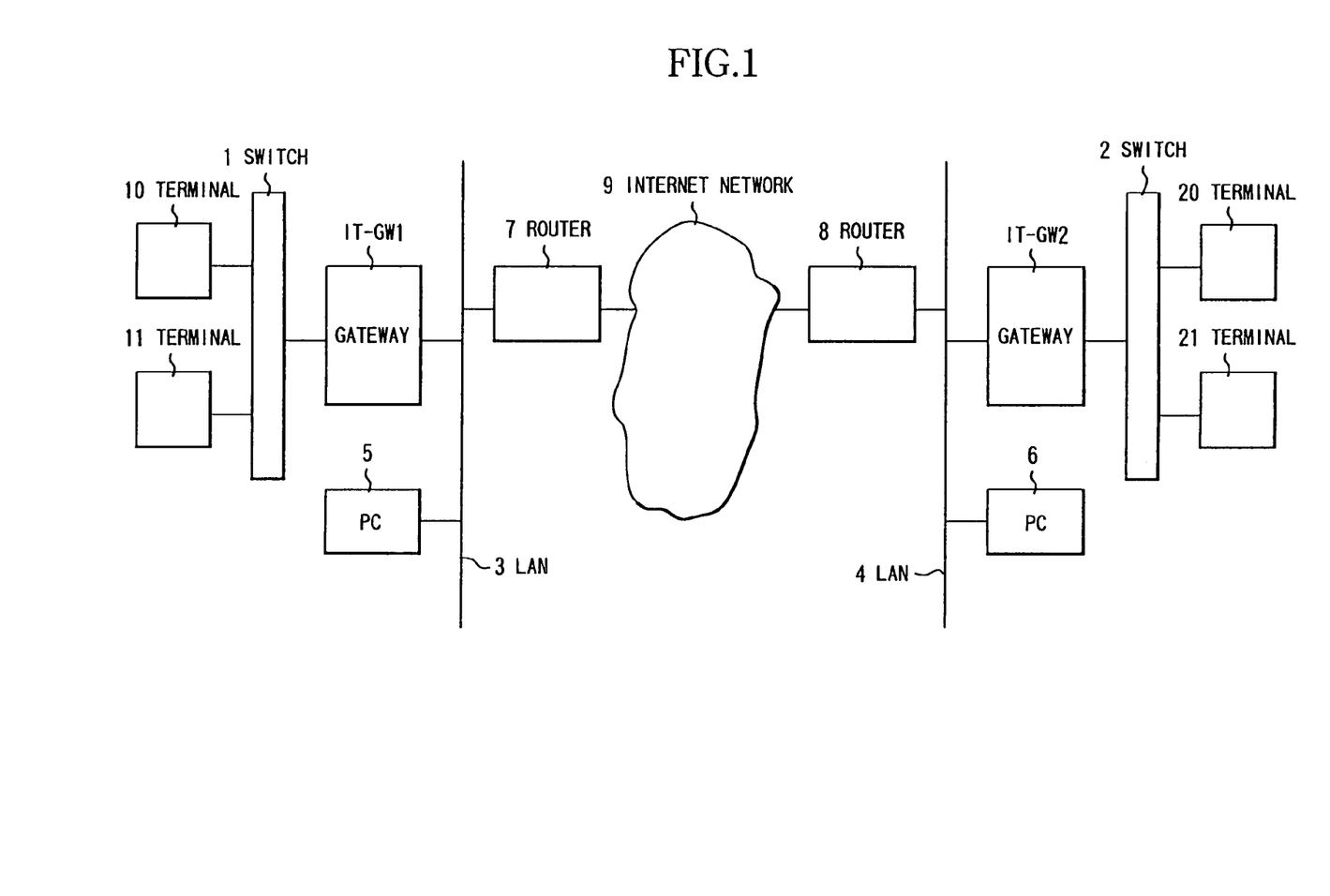
FIG. 1 is a block diagram showing a structure of an Internet telephony system in one embodiment of the present invention.

FIG. 1 shows a structure of an Internet telephony system in one embodiment of the present invention. Referring to FIG. 1, a switch 1 constituting a telephone network serving as a circuit switched network accommodates terminals 10 and 11. Further, a switch 2 accommodates terminals 20 and 21. Those terminals 10, 11, 20 and 21 are classified as telephone terminals each incorporating a voice communications function. Note that those terminals 10, 11, 20 and 21 may take such a form as to be directly accommodated in Internet telephony gateways IT-GW1 and IT-GW2.

The Internet telephony gateways IT-GW1 and IT-GW2 respectively connect the switches 1 and 2 to local area networks (LANs) 3 and 4. In addition to the gateways IT-GW1 and IT-GW2, personal computers (PC) 5 and 6 as data terminals each incorporating a data communications function and routers 7 and 8 as relay devices, are connected to the LANs 3 and 4. The gateway IT-GW1 or IT-GW2 and the router 7 or 8 can be physically provided within the same box body. An Internet network 9 categorized as a packet switched network is connected to the routers 7 and 8, and accommodates the data terminals (not shown) such as the personal computers (PC) each having the data communications function. An intranet network may be, if the packet switched network is an intra-company network, substituted for this Internet network 9. Further, the Internet network 9 is constructed of private lines, ISDN, LAN and WAN. With this architecture, a cored relay network of the Internet telephony is configured.

[Detailed Configuration of Gateway]

Figure 2:
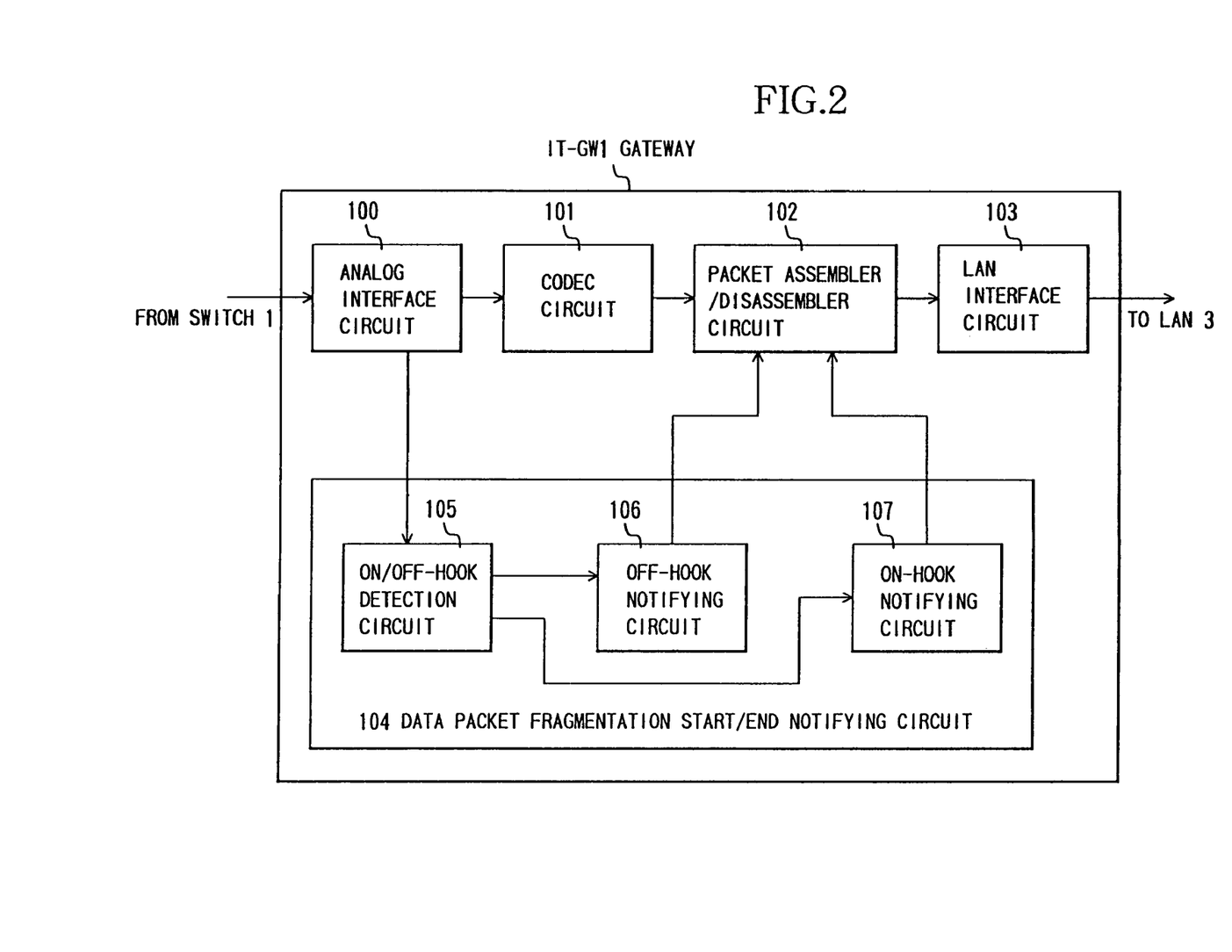
FIG. 2 is a block diagram illustrating a detailed configuration of an Internet telephony gateway in the system shown in FIG. 1.

Each of the gateways IT-GW1 and IT-GW2 in the Internet telephony system illustrated in FIG. 1 is, as shown in FIG. 2, constructed of an analog interface circuit 100, a coder/decoder (CODEC) circuit 101, a packet assembler/disassembler circuit 102, a LAN interface circuit 103, and a data packet fragmentation start/end notifying circuit 104. The data packet fragmentation start/end notifying circuit 104 includes an on/off-hook detection circuit 105, an off-hook notifying circuit 106 and an on-hook notifying circuit 107.

In the gateway IT-GW1, the analog interface circuit 100 receives analog voice information from the switch 1, and forwards the same information to the CODEC circuit 101. The CODEC circuit 101 encodes and compresses the inputted analog voice information, and forwards the encoded/compressed information to the packet assembler/disassembler circuit 102. The packet assembler/disassembler circuit 102 assembles the inputted encoded voice information into an Internet protocol (IP) packet IPP (which will hereinafter be explained in depth) by use of a packet assembly function unit thereof, and forwards the thus assembled IP packet IPP to the LAN interface circuit 103. The LAN interface circuit 103 transmits the inputted IP packet (voice packet AUP) IPP of the voice information to the LAN 3.

In the data packet fragmentation start/end notifying circuit 104 of the gateway IT-GW1, the on/off-hook detection circuit 105 monitors change-of-state signals indicating an off-hook state (transition of calling state) and an on-hook state (end-of-speech state) of the terminals 10 and 11 accommodated in the switch 1 via the analog interface circuit 100. The off-hook notifying circuit 106, when an off-hook state change signal indicating an off-hook state of at least one single terminal is inputted thereto from the on/off-hook detection circuit 105, transmits an off-hook state occurrence signal to the packet assembler/disassembler circuit 102 in order to start fragmenting the data packet in the router 7. The on-hook notifying circuit 107, when the on-hook state change signals indicating the on-hook states of all the terminals are inputted thereto after the off-hook state change signal indicating the off-hook state of the terminal has been inputted from the on/off-hook detection circuit 105, transmits an off-hook state end signal to the packet assembler/disassembler circuit 102 in order to end the fragmentation of the data packet in the router 7.

Figure 3:
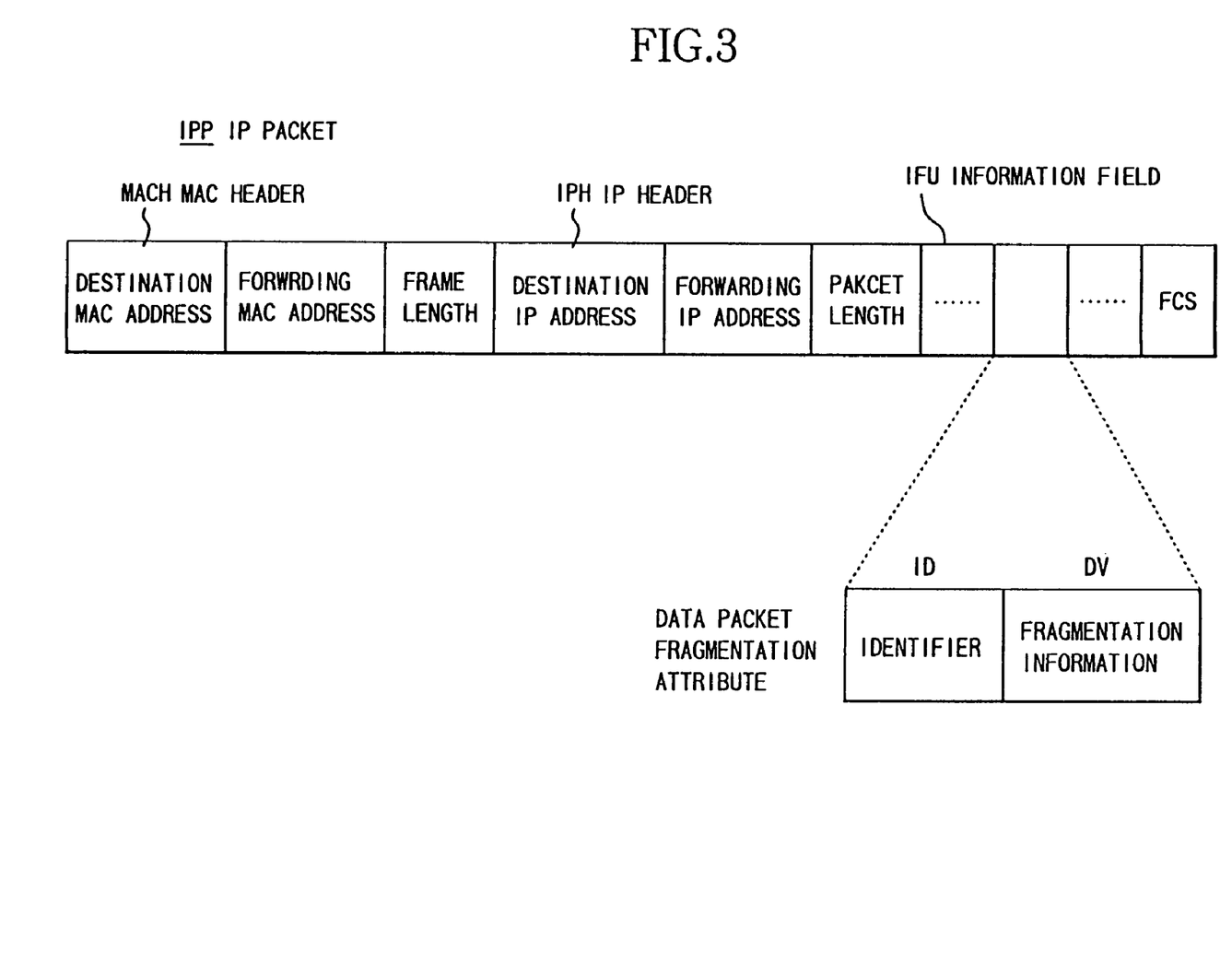
FIG. 3 is a diagram showing a frame structure of an IP packet in the system shown in FIG. 1.

The packet assembler/disassembler circuit 102, when an off-hook state change signal is inputted from the off-hook notifying circuit 106 of the data packet fragmentation start/end notifying circuit 104, assembles a packet in which data packet fragmentation start indication information is set in an information field IFU of the IP packet IPP taking a frame structure shown in FIG. 3. This piece of fragmentation start indication information consists of an identifier ID and fragmentation information DV, and in this case the identifier ID is set to [01] while the fragmentation information DV is set to [00]. The packet assembler/disassembler circuit 102, when an on-hook state change signal is inputted from the on-hook notifying circuit 107 of the data packet fragmentation start/end notifying circuit 104, assembles a packet in which data packet fragmentation end indication information is set in the information field IFU of the IP packet IPP. This piece of fragmentation end indication information consists of an identifier ID and fragmentation information DV, and in this case the identifier ID is set to [01] while the fragmentation information DV is set to [01].

For indicating the start and end of fragmenting the data packet, a frame of the IP packet IPP assembled by the packet assembler/disassembler circuit 102, as shown in FIG. 3, consists of a MAC header MACH, an IP header IP, the information field IFU and a frame check sequence FCS. Herein, the MAC header MACH contains a destination MAC address, a forwarding MAC address, and a frame length. Further the IP header IPH contains a destination IP address, a forwarding IP address and a packet length. Moreover, as explained above, a data packet fragmentation attribute for the data packet fragmentation start/end indication information contained in the information field IFU, includes an identifier ID and fragmentation information DV. Note that a frame of the voice packet AUP corresponding to the voice information which is assembled by the packet assembler/disassembler circuit 102 and forwarded from the terminal, has a structure excluding the data packet fragmentation attribute.

The transmission-side configuration of the gateway IT-GW1 has been described so far, however, a receipt-side configuration thereof does not have much importance in this invention, of which an explanation is therefore herein omitted.

[Detailed Configuration of Router]

Figure 4:
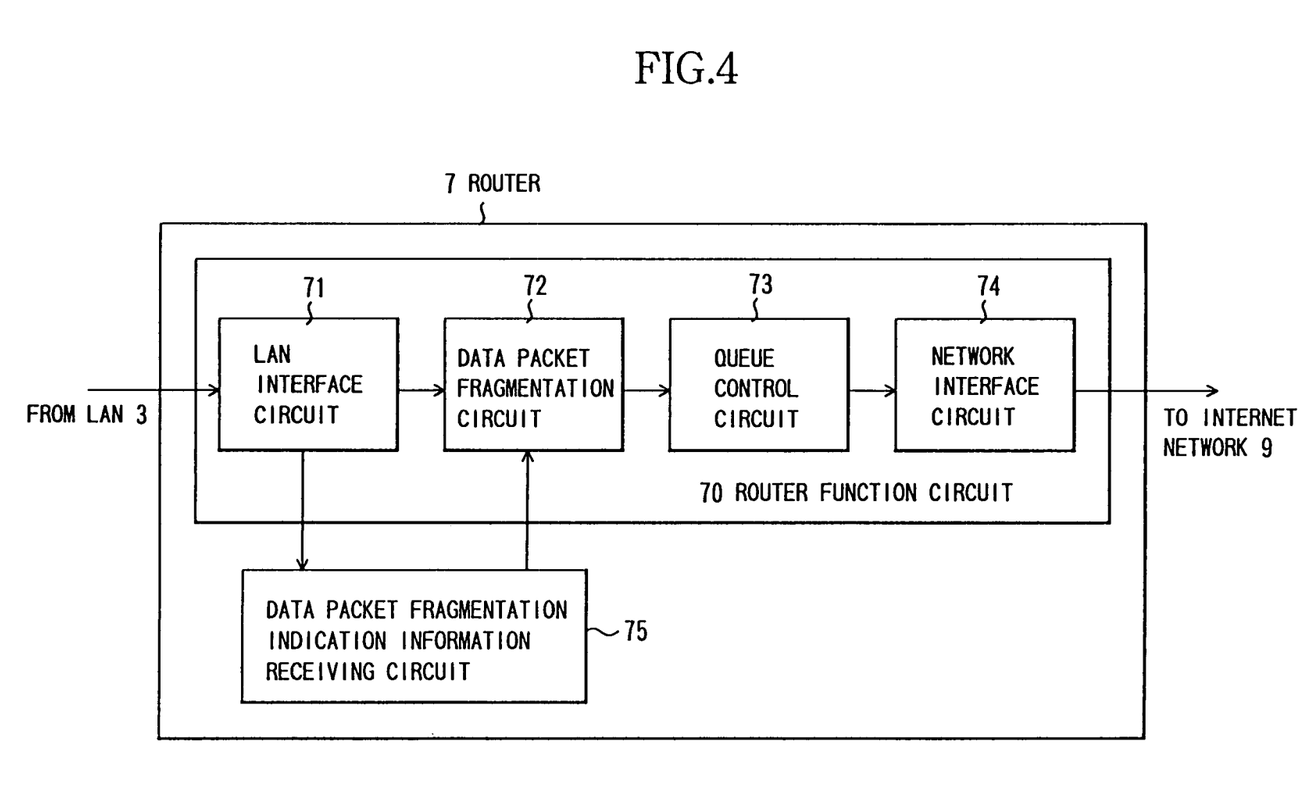
FIG. 4 is a block diagram showing a detailed configuration of a router in the system shown in FIG. 1.

The router 7 (8) in the Internet telephony system illustrated in FIG. 1 is, as shown in FIG. 4, constructed of a router function circuit 70 including a LAN interface circuit 71, a data packet fragmentation circuit 72, a queue control circuit 73 and a network interface circuit 74, and of a data packet fragmentation indication information receiving circuit 75. The LAN interface circuit 71 in the router 7 receives the IP packet IPP (including the voice packet AUP and the data packet DTP) forwarded from the gateway IT-GW1 and the data terminal 5. The data packet fragmentation indication information receiving circuit 75 receives the IP packet IPP via the LAN interface circuit 71, and identifies the identifier ID and the fragmentation information DV contained in the information field IFU. As a result, the receiving circuit 75, when a content of the identifier ID is [01] and shows a data packet fragmentation attribute while a content of the fragmentation information DV is [00] and shows a data packet fragmentation start indication, stores a built-in memory with a piece of data packet fragmentation start indication information, and notifies the data packet fragmentation circuit 72 of being in a data packet fragmentation start indication receiving status.

The data packet fragmentation circuit 72 having received this notification, there being a necessity for transferring (a priority transfer) the voice packet AUP, sets a maximum packet length to a predetermined small value (a first set value), and routes the subsequent data packets DTP and voice packets AUP with a value under this set value (a limit value). Therefore, the data packet fragmentation circuit 72, upon an input of the data packet DTP or the voice packet AUP from the LAN interface circuit 71, judges whether or not a packet length thereof exceeds the first set value. If over the first set value, the data packet fragmentation circuit 72 fragments this packet to a fragmentation length indicated by the first set value. Normally, the packet length of the voice packet AUP does not exceed the first set value, and only the data packet DTP becomes a fragmentation target.

Further, the receiving circuit 75, when the content of the identifier ID is [01] and shows the data packet fragmentation attribute while the content of the fragmentation information DV is [01] and shows a data packet fragmentation end indication, stores the built-in memory with a piece of data packet fragmentation end indication information, and notifies the data packet fragmentation circuit 72 of being in a data packet fragmentation end indication receiving status. The data packet fragmentation circuit 72 having received this notification, there being no necessity for transferring the voice packet AUP, sets the maximum packet length to a predetermined large value (a second set value), and routes the subsequent data packets DTP and voice packets AUP with a value under the second set value. Incidentally, when the data packet fragmentation circuit 72 routes the packet, the above-described fragmentation control may be performed by positively reading the data packet fragmentation start/end indication information from the built-in memory of the receiving circuit 75.

The queue control circuit 73 executes control to temporarily accumulate in a queue buffer memory the voice packets AUP and the data packets DTP inputted from the data packet fragmentation circuit 72, and to forward those packets to the network interface circuit 74. The queue control circuit 73, in this control process, identifies that the packet is, e.g., the voice packet AUP on the basis of the forwarding IP address (indicating the gateway IT-GW1) in the IP header IPH, and accumulates that voice packet AUP in the queue buffer memory exhibiting a high priority. The network interface circuit 74 transmits to the Internet network 9 the voice packet AUP and the data packet DTP forwarded from the queue buffer memory included in the queue control circuit 73.

[Operation of Internet Telephony System]

Next, an operation of the Internet telephony system discussed above will be described with reference to FIGS. 1, 2, 3, 4 and operation flowcharts in FIGS. 5 through 8 in combination with respect to a case where the terminal 10 accommodated in the switch 1 makes a call-out for talking with the terminal 20 accommodated in the switch 2.

Figure 5:
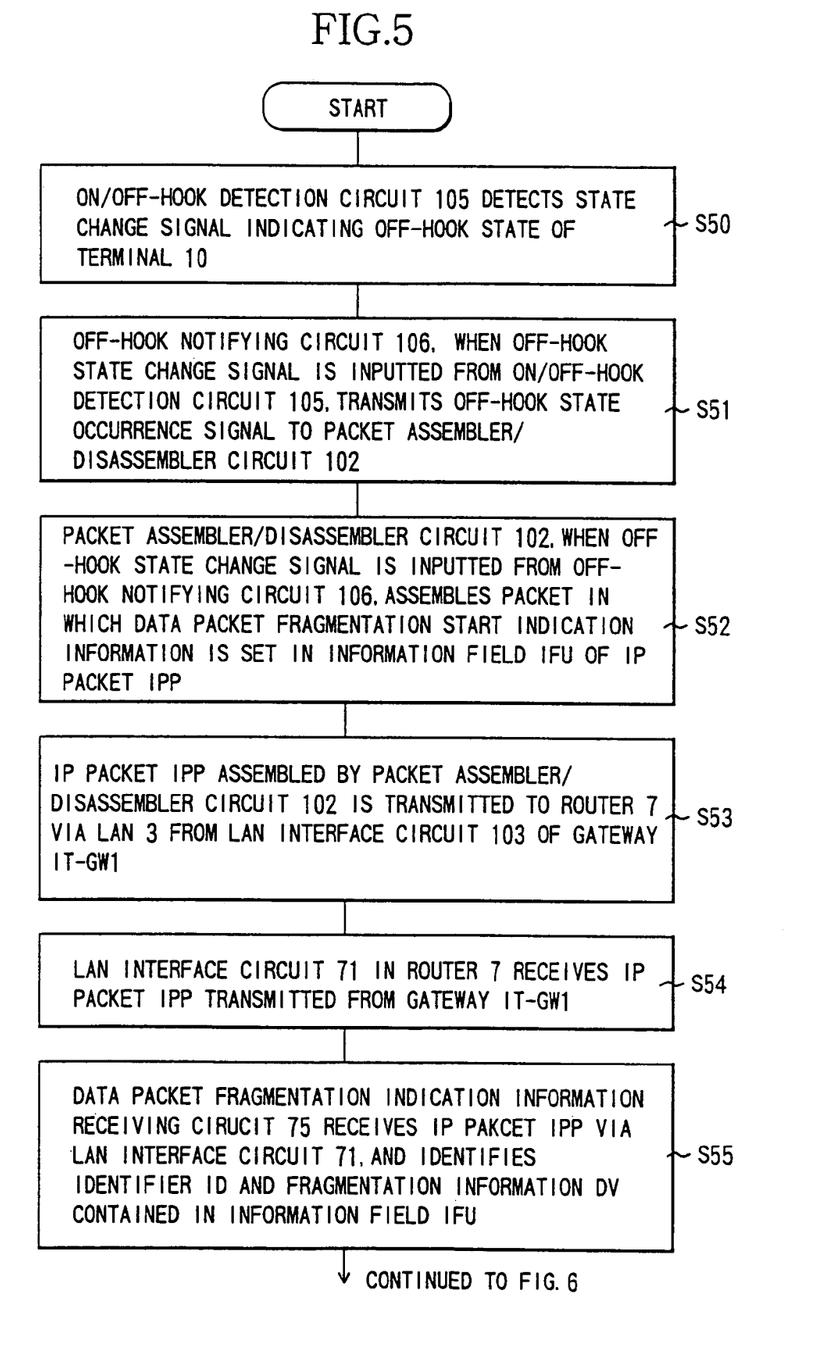
FIG. 5 is an explanatory flowchart showing an operation of the system shown in FIG. 1.

When the terminal 10 makes the call-out by off-hook, the on/off-hook detection circuit 105 of the gateway IT-GW1 detects a state change signal indicating an off-hook state of the terminal 10, which is transmitted from the switch 1 via the analog interface circuit 100 (step S50 in FIG. 5). The off-hook notifying circuit 106, upon an input of the off-hook state change signal indicating an off-hook state of the terminal 10 from the on/off-hook detection circuit 105, transmits an off-hook state occurrence signal to the packet assembler/disassembler circuit 102 in order to start the fragmentation of the data packet in the router 7 (S51). The packet assembler/disassembler circuit 102, when the off-hook state change signal is inputted from the off-hook notifying circuit 106 of the data packet fragmentation start/end notifying circuit 104, assembles a packet in which the data packet fragmentation start indication information is set in the information field IFU of the IP packet IPP (see FIG. 3). In the data packet fragmentation start indication information of the IP packet IPP assembled herein, the identifier ID thereof is set to [01], and the fragmentation information DV thereof is set to [00], respectively (S52). Further, in this IP packet IPP, the destination MAC address of the MAC header MACH indicates the router 7, the forwarding MAC address indicates the gateway IT-GW1. Moreover, the destination IP address of the IP header IPH indicates the router 7, and the forwarding IP address indicates the gateway IT-GW1. For indicating the start of fragmentation of the data packet, the IP packet IPP assembled by the packet assembler/disassembler circuit 102 is forwarded to the router 7 via the LAN 3 from the LAN interface circuit 103 of the gateway IT-GW1 (S53).

The LAN interface circuit 71 in the router 7 receives the IP packet IPP forwarded from the gateway IT-GW1 (S54). The data packet fragmentation indication information receiving circuit 75 receives this IP packet IPP via the LAN interface circuit 71, and identifies the identifier ID and the fragmentation information DV contained in the information field IFU (S55). As a result, the receiving circuit 75, when the content of the identifier ID is [01] and shows the data packet fragmentation attribute while the content of the fragmentation information DV is [00] and shows the data packet fragmentation start indication, stores the data packet fragmentation start indication information by setting a data packet fragmentation start bit in the built-in memory to [1], and notifies the data packet fragmentation circuit 72 of being in a data packet fragmentation start indication receiving status (S56 in FIG. 6).

Figure 6:
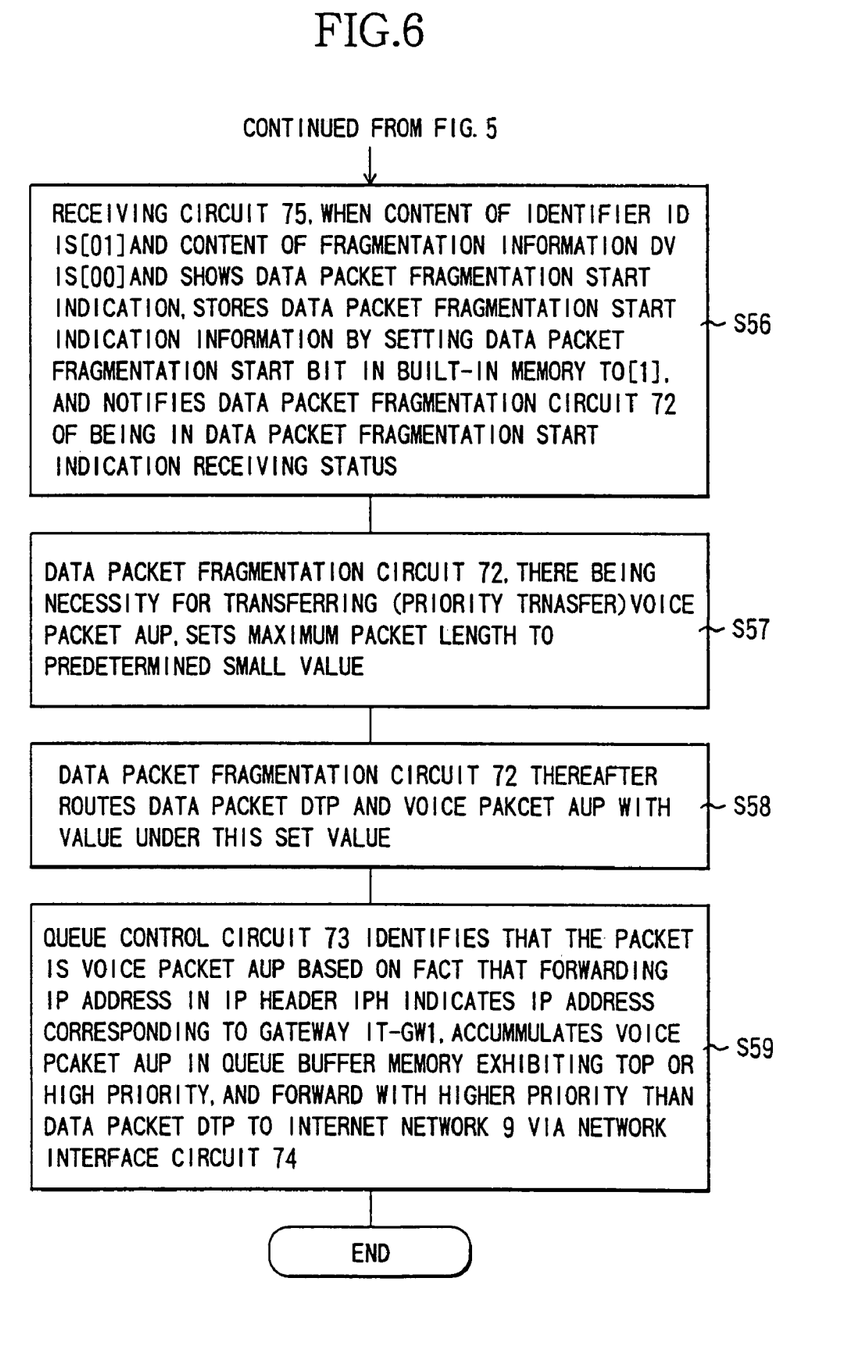
FIG. 6 is an explanatory flowchart showing the operation of the system shown in FIG. 1.

The data packet fragmentation circuit 72 having received this notification, there being a necessity for transferring (the priority transfer) the voice packet AUP, sets the maximum packet length to the predetermined small value (the first set value) (S57). The data packet fragmentation circuit 72 thereafter routes the data packets DTP and voice packets AUP with a value under this set value (S58). Accordingly, the data packet fragmentation circuit 72, when the data packet DTP or the voice packet AUP is inputted from the LAN interface circuit 71, judges whether or not the packet length thereof exceeds the first set value. If over the first set value, the data packet fragmentation circuit 72 fragments this packet to the fragmentation length indicated by the first set value. Normally, the packet length of the voice packet AUP does not exceed the first set value, and only the data packet DTP becomes a fragmentation target.

The queue control circuit 73 temporarily accumulates in the queue buffer memory the voice packets AUP and the data packets DTP inputted from the data packet fragmentation circuit 72, and forwards those packets to the network interface circuit 74. In this case, the queue control circuit 73 identifies that the packet is the voice packet AUP on the basis of the forwarding IP address in the IP header IPH, and accumulates that voice packet AUP in the queue buffer memory exhibiting the top or high priority. Then, the queue control circuit 73 forwards the packet AUP with a higher priority than the data packet DTP to the Internet network 9 via the network interface circuit 74 (S59).

Figure 7:
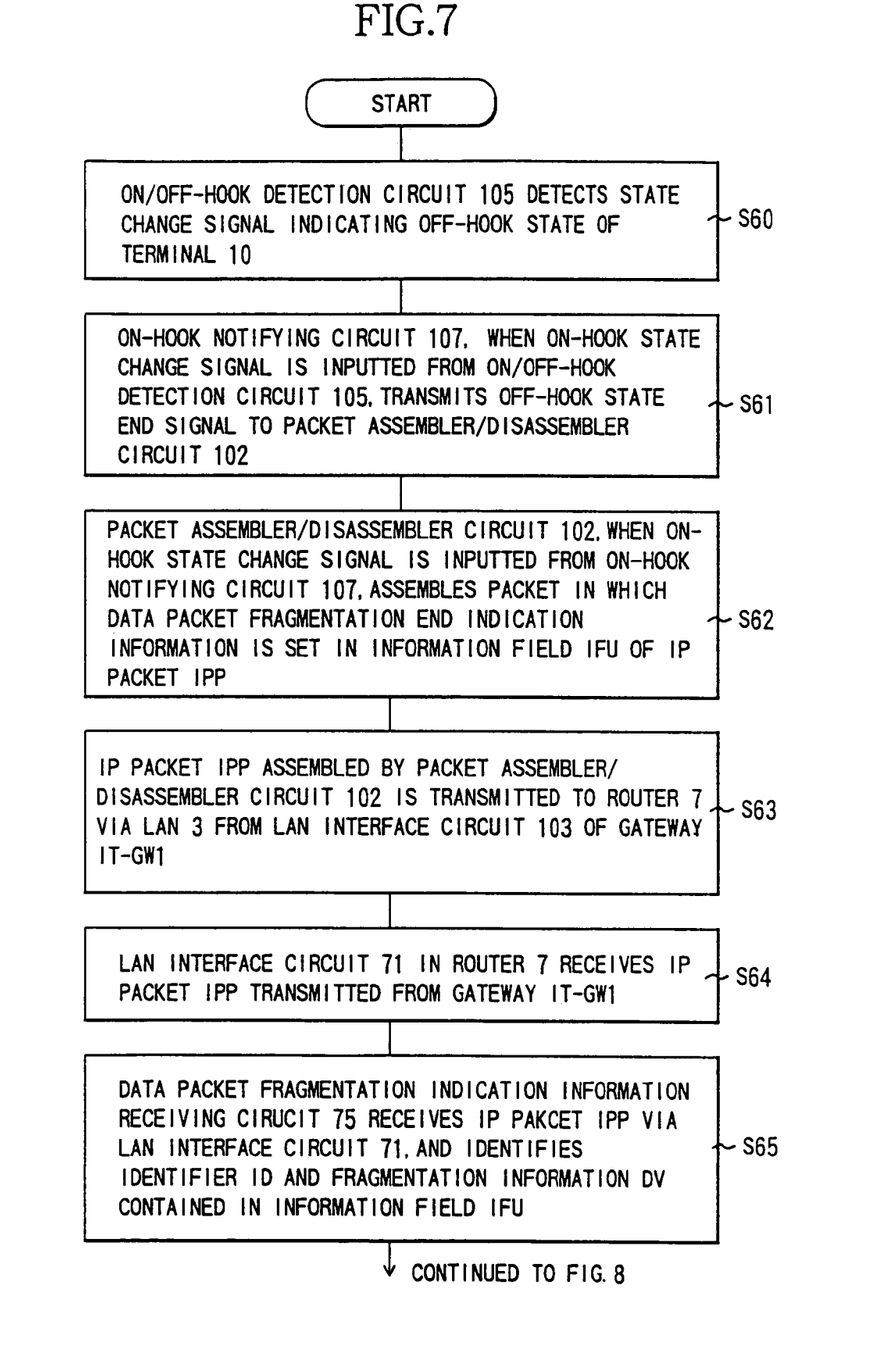
FIG. 7 is an explanatory flowchart showing the operation of the system shown in FIG. 1.

On the other hand, the terminal 10 performs on-hook upon an end of the talk, at which time the on/off-hook detection circuit 105 of the gateway IT-GW1 detects the state change signal indicating the on-hook state of the terminal 10 which is transmitted from the switch 1 via the analog interface circuit 100 (step S60 in FIG. 7). The on-hook notifying circuit 107, when the on-hook state change signals indicating the on-hook states of all the terminals are inputted thereto after the off-hook state change signal indicating the off-hook state of the terminal 10 has been inputted from the on/off-hook detection circuit 105, transmits the off-hook state end signal to the packet assembler/disassembler circuit 102 in order to finish the fragmentation of the data packet in the router 7. The packet assembler/disassembler circuit 102, when the on-hook state change signal is inputted from the on-hook notifying circuit 107 of the data packet fragmentation start/end notifying circuit 104, assembles a packet in which data packet fragmentation end indication information is set in the information field IFU of the IP packet IPP. In the fragmentation end indication information assembled herein, the identifier ID is set to [01] and the fragmentation information DV is set to [01], respectively (S62). For indicating the end of fragmentation of the data packet, the IP packet IPP assembled by the packet assembler/disassembler circuit 102 is forwarded to the router 7 via the LAN 3 from the LAN interface circuit 103 of the gateway IT-GW1 (S63).

The LAN interface circuit 71 in the router 7 receives the IP packet IPP forwarded from the gateway IT-GW1 (S64). The data packet fragmentation indication information receiving circuit 75 receives this IP packet IPP via the LAN interface circuit 71, and identifies the identifier ID and the fragmentation information DV contained in the information field IFU (S65). As a consequence, the receiving circuit 75, when the content of the identifier ID is [01] and shows the data packet fragmentation attribute while the content of the fragmentation information DV is [01] and shows the data packet fragmentation end indication, stores the data packet fragmentation end indication information by setting a data packet fragmentation start bit in the built-in memory to [0], and notifies the data packet fragmentation circuit 72 of being in a data packet fragmentation end indication receiving status (S66 in FIG. 8).

Figure 8:
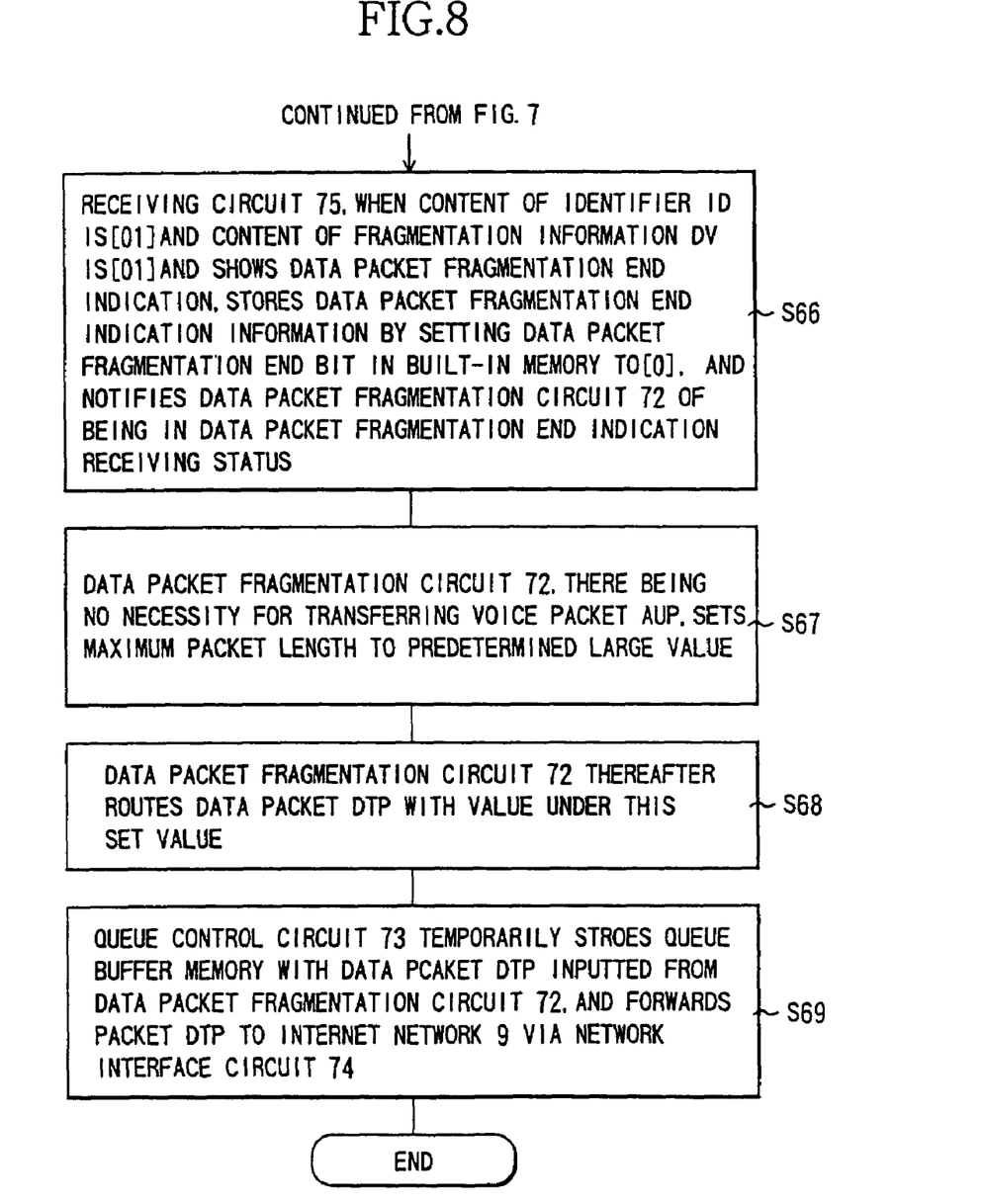
FIG. 8 is an explanatory flowchart showing the operation of the system shown in FIG. 1.

The data packet fragmentation circuit 72 having received this notification, there being no necessity for transferring the voice packet AUP, sets the maximum packet length to the predetermined large value (the second set value) (S67). The data packet fragmentation circuit 72 thereafter routes only the data packets DTP with a value under this set value (S68). The queue control circuit 73 temporarily accumulates in the queue buffer memory the data packets DTP inputted from the data packet fragmentation circuit 72, and forwards those packets to the Internet network 9 via the network interface circuit 74 (S69).

As discussed above, according to this Internet telephony system, when the transfer of the voice packet AUP is not needed, the maximum packet length is set to a large value, e.g., the maximum value determined on the transmission path, whereby the data packets DTP can be optimally transferred. Further, if necessary for transferring the voice packets AUP together with the data packets DTP, the maximum packet length is set to, e.g., 300 bytes, and the voice packets AUP are preferentially transferred, thereby making it feasible to transfer the packets while restraining a delay of the voice packets AUP.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. An Internet telephone system having an Internet network for transferring voice information in the form of a voice packet which is transmitted from a voice communications terminal incorporating a voice communications function, and transferring data in the form of a data packet which are transmitted from a data communications terminal incorporating a data communications function, said system comprising:
   a first detecting unit for detecting a transition of a call-out state of said voice communications terminal;
   a packet assembling unit for assembling, when said first detecting unit detects the transition of the call-out state of said voice communications terminal, a control packet containing indication information for changing, to a predetermined limit value, a maximum length of each of the data packets transferred via said Internet network; and
   a first routing unit for routing, when receiving the control packet containing the indication information, each of the data packets and the voice packet to said Internet network while restricting the maximum length of the data packet to the predetermined limit value.

2. An Internet telephony system according to claim 1, further comprising a second routing unit for preferentially routing the voice packet to said Internet network under the condition that said first routing unit routes the data packet in accordance with the predetermined limit value.

3. An Internet telephony system according to claim 1, wherein said first routing unit, when receiving the control packet, fragments the data packet having a length exceeding the predetermined limit value in order to route each of the data packets to said Internet network in accordance with the predetermined limit value.

4. An Internet telephony system according to claim 1, further comprising a second detecting unit for detecting an end-of-communications state of said voice communications terminal.

5. An Internet telephony system according to claim 4, wherein when said second detecting unit detects the end-of-communications state of said voice communications terminal, said packet assembling unit assembles a control packet containing indication information in order for said first routing unit to make each of the data packets transferable to said Internet network up to the maximum length.

6. An Internet telephony system according to claim 5, wherein each of the voice packet, the data packet and the control packet takes the form of an Internet Protocol packet.

7. An Internet telephony system according to claim 6, wherein said first and second detecting units and said packet assembling unit are provided in a gateway for converting the voice information transmitted from said voice communications terminal into a packet in accordance with the Internet Protocol, and
   said first routing unit and a second routing unit are provided in a router for routing the Internet Protocol packet to said Internet network.

8. A method of controlling a packet transfer in an Internet telephone system having an Internet network for transferring voice information in the form of a voice packet which is transmitted from a voice communications terminal incorporating a voice communications function, and transferring data in the form of a data packet which are transmitted from a data communications terminal incorporating a data communications function, said method comprising:
   a first step of detecting a transition of a call-out state of said voice communications terminal;
   a second step of assembling, when detecting the transition of the call-out state of said voice communications terminal, a control packet containing indication information for changing, to a predetermined limit value, a maximum length of each of the data packets transferred via said Internet network; and
   a third step of routing, when receiving the control packet containing the indication information, each of the data packets and the voice packet to said Internet network while restricting the maximum length of the data packet to the predetermined limit value.

9. A method of controlling a packet transfer according to claim 8, further comprising a fourth step of preferentially routing the voice packet to said Internet network under the condition that the data packet is routed in accordance with the predetermined limit value in said third step.

10. A method of controlling a packet transfer according to claim 8, further comprising a fifth step of detecting an end-of-communications state of said voice communications terminal.

11. A method of controlling a packet transfer according to claim 10, further comprising a sixth step of assembling, when the end-of-communications state of said voice communications terminal is detected in said fifth step, a control packet containing indication information for making each of the data packets transferable to said Internet network up to the maximum length.

12. An Internet telephony system according to claim 1, wherein the predetermined limit value is smaller than the maximum length of the data packet.

13. A method of controlling a packet transfer according to claim 8, wherein the predetermined limit value is smaller than the maximum length of the data packet.

* * * * *

UNITED STATES PATENT AND TRADEMARK OFFICE
CERTIFICATE OF CORRECTION

PATENT NO.        : 6,967,928 B1
APPLICATION NO. : 09/528822
DATED             : November 22, 2005
INVENTOR(S)       : Rumiko Kikuta It is certified that error appears in the above-identified patent and that said Letters Patent is hereby corrected as shown below:

Claim 1 column 10, line 4: "restricting" should be changed to --changing--.
Claim 8 column 10, line 64: "restricting" should be changed to --changing--.

Signed and Sealed this

Twenty-eighth Day of November, 2006

JON W. DUDAS
*Director of the United States Patent and Trademark Office*